United States Patent
Fisher, Jr. et al.

(10) Patent No.: US 6,648,139 B2
(45) Date of Patent: Nov. 18, 2003

(54) CARRYING CASE WITH INTERNAL SLIDING-MEMBER SPRING CLIP TO GRASP AND HOLD DIVERSE PORTABLE ELECTRONIC DEVICES INCLUDING PERSONAL DIGITAL ASSISTANTS

(76) Inventors: Herbert Fisher, Jr., c/o National Leather Goods Co., Inc., P.O. Box 2210, Chula Vista, CA (US) 91911; Daniel Huang, c/o National Leather Goods Co., Inc. P.O. Box 2210, Chula Vista, CA (US) 91911

(*) Notice: Subject to any disclaimer, the term of this patent is extended or adjusted under 35 U.S.C. 154(b) by 0 days.

(21) Appl. No.: 10/100,868

(22) Filed: Mar. 18, 2002

(65) Prior Publication Data

US 2003/0173242 A1 Sep. 18, 2003

(51) Int. Cl.⁷ .............................................. B65D 85/00
(52) U.S. Cl. ...................................... 206/320; 206/472
(58) Field of Search .................................. 206/370, 449, 206/37, 38, 37.5, 477, 478, 480, 453, 305, 472, 473; 24/459, 517, 457, 518, 662; 248/229.22, 229.26, 228.3, 228.7, 231.41, 231.81

(56) References Cited

U.S. PATENT DOCUMENTS

| | | | | |
|---|---|---|---|---|
| 656,274 A | * | 8/1900 | Streeter | 403/387 |
| 2,469,451 A | * | 5/1949 | Burrus | 248/222.12 |
| 2,541,828 A | * | 2/1951 | Peck | 248/222.12 |
| 3,003,736 A | * | 10/1961 | Hofgesang | 248/229.26 |
| 5,555,157 A | | 9/1996 | Moller et al. | |
| 5,586,741 A | * | 12/1996 | Cuneo | 248/229.26 |
| 6,105,764 A | | 8/2000 | Scicluna et al. | |
| 6,196,405 B1 | | 3/2001 | Kasmbouris | |
| 6,264,029 B1 | * | 7/2001 | Motson | 206/320 |
| 6,286,668 B1 | | 9/2001 | Moses | |
| D448,930 S | | 10/2001 | Kambouris | |
| 6,302,361 B1 | * | 10/2001 | Schaefer et al. | 248/27.3 |

OTHER PUBLICATIONS

Victorinox Catalog 2002; "Urban Issue" product, "PDA Clip" systems.
Swiss Army Catalog 2002; Personal Digital Assistant (PDA) Portofolio Wallet product, "PDA Clip" system.

* cited by examiner

Primary Examiner—Shian Luong
(74) Attorney, Agent, or Firm—Fuess & Davidenas (57) ABSTRACT

A carrying and storage case, typically made of leather and of nominal size 4½" W×7" H×1½" D, is adequately voluminous so as to contain within its interior a number of differently-sized and -shaped portable electronic device, normally personal digital assistants (PDAS) of various manufacturer. The contained PDAs are held by a low-profile, side-grasping, self-adjusting spring-loaded clip mechanism. The spring clip has a central member affixed to the interior of the enclosure, and substantially symmetrical left and right members sliding under spring forces relative to, and in distension from, both the central member and each other so as to, while momentarily forcibly separated, receive the portable electronic device and then, being permitted to slidingly retract and to squeeze and to grasp the portable electronic device between them, holding fast the portable electronic device within the carrying case.

13 Claims, 4 Drawing Sheets

CARRYING CASE WITH INTERNAL SLIDING-MEMBER SPRING CLIP TO GRASP AND HOLD DIVERSE PORTABLE ELECTRONIC DEVICES INCLUDING PERSONAL DIGITAL ASSISTANTS

BACKGROUND OF THE INVENTION

1. Field of the Invention

The present invention generally concerns carrying cases for portable electronic devices including devices in the nature of personal digital assistants, cellular telephones, personal computers and the like.

The present invention particularly concerns carrying cases accommodating electronic devices of differing sizes and/or types by removably affixing a device to the interior of the case.

The present invention still more particularly concerns carrying cases removably affixing any one of a number of differently-sized electronic devices, most typically a personal digital assistant (PDA), within the interior of the case by action of a spring clip.

2. Description of the Prior Art

2.1 The Limitations of Custom Cases

Carrying cases for portable electronic devices such as personal digital assistants, cellular telephones, personal computers and the like have traditionally been contoured and sized to the individual device held. Whereas this approach has made sense in times past when the electronic device was very, very much more expensive than its tailored case—typically on the order of ten or more times—while the lifetime of the electronic device and its case were roughly commensurate, this approach makes less sense when persons in the advanced industrial countries are coming to own many, and rapidly substitutable—even disposable—low cost electronic devices while fine carrying cases for these devices, especially as are hand crafted of leather and like luxury materials, retain historical price levels.

A case that is tailored to an individual electronic device as offered by the electronics manufacturer of the device seldom has the style and quality of an equivalent case sold in the aftermarket, and thus necessarily succeeding on its own competitive merits. However, after-market device cases suffer from poor economies of scale, with some cases being useful for only limited numbers of limited types and models of devices, and with dilution of the potential purchaser base occurring because (i) many persons by the case of the original equipment manufacturer, and/or (ii) a carrying case may be bundled with the electronic device.

Although consumers may not much regard this situation, they receive poor value. It is as if a suitcase was to be procured from a clothing manufacturer—an idea that strikes most people as absurd, being that clothing manufacturers generally have no great reputation, nor expertise, in luggage. A consumer is also disadvantaged in that a custom case for an electronic equipment may not be worn out, and, indeed, may have but slight or even no appreciable wear, at the time that the contained electronic equipment is replaced, often from obsolescence (not affecting the case).

According to all these reasons, if a single case could be made ubiquitous—while still suitable—for a broader range of electronic equipments, especially as may be of slightly varying size and/or contour, then the consumer might be offered (i) greater selection, (ii) better value, and (iii) greater usable life, in the carrying cases for the electronic equipments.

2.2 Previous Approaches to Universal Cases

Chief among the problems of using one, slightly oversize, case for a range of like, and like sized, electronic equipments is the practical necessity of keeping the electronic equipment from moving—rattling, if the case material is hard—around inside the case. The simple, and classical solution has been tie down straps. However, (i) these straps are unsightly and ungainly, (ii) they may and commonly do interfere with manual access to the user control area (e/g/. the keyboard) and/or visual access to any display, and (iii) they may impede easy removal of the electronic device from its case. These limitations have proven especially acute for electronic devices in the form of personal digital assistants (PDAs), which routine have to the fore of the device, and upon its front panel, a very dense and compact user interface. This interface is desirably, almost necessarily, neither obscured not obstructed in any manner—necessitating that a contained PDA be held (if at all) from its sides of back.

PDA Cases are available under brands Nite Ize, Impulse, Incipio, Landware, Marware, OP/TECH USA, RhinoSkin, Sumdex, Targus, Hartmann and Haliburton.

An example of the recent patenting of Victorinox AG (Ibach, CH) is U.S. Pat. No. 6,257,405 to Painsith for a CARD-SHAPED STORAGE CASE FOR ARTICLES OF DAILY USE AND/OR CONSUMER ARTICLES. The card-shaped storage case is made of metal or plastic with at least one internal storage compartment for at least one article, which storage compartment is defined by a base plate and, at least in sections, by a cover plate of the storage case running parallel to this. Several storage compartments at least partially separated from one another are arranged in the storage case in a plane running parallel to the base plate and/or cover plate. These are constructed to receive articles in the form of articles of daily use and/or consumer articles, and are also accessible from the outside via storage openings. These storage openings are arranged in at least one of the longitudinal side faces and/or transverse side faces, preferably there running perpendicular to the base plate and/or the cover plate.

Swiss Army mounts a variety of personal digital assistants in a patented "PDA Clip" system. An allegedly patented PDA clip safely secures the unit while providing for simple removal and insertion of the PDA. Three (3) clips are included, one each for the Palm Pilot 3, 5 and 7 units.

As well as the function of mounting a PDA, the Swiss Army system contains, as is common, paper currency in a full size bill pocket, business and credit cards in three card slots and two slash pockets in the wallet, an allegedly patented ID pull out tray for a drivers license that slides in and out easily, additional business and credit cards slots, an additional translucent window for pictures and other cards, a card case that can be removed and used as a casual "weekend wallet", a velcro tab also included for attachment of other PDA units.

The case is made of the leather, and measures 5¼" H×4" W×1½" D.

SUMMARY OF THE INVENTION

The present invention contemplates a carrying case having an internal, sliding-member, spring clip suitable to grasp and to hold diverse electronic devices particularly including, but not limited to, personal digital assistants (PDAs).

A case of the present invention is characterized in that it safely, securely, and flexibly accommodates diverse electronic devices—typically as are hand held, and more typically being any of a large number of personal digital assistants (PDAs) present in the world market circa 2002— of differing sizes. An electronic device need only be simply and quickly "snapped" but one time into the sliding-member spring clip internal retaining feature of the case, and will thereafter be stably held when the case is both open and closed.

A case of the present invention is thus "universal" for diverse hand-held electronic devices, and (i) enjoys economies of scale in manufacture and distribution, while (ii) according good value to a consumer who may normally continue to use the case even should the particular electronic device contained within the case be replaced. The particular sliding-member spring clip affixation mechanism used is compact, strong, lightweight, durable, simple and reliable. The affixation mechanism does not obstruct full access to the front panel, nor any side surface communication ports and switches, of the electronic device—normally a PDA—that it serves to releasibly mount. Neither does the affixation mechanism have (i) any separate part which must be affixed to the held electronic device (and which may thus suffer potentially becoming lost), nor (ii) any straps that may have ends which might "flop around" within the case and upon the contents of the case, potentially eroding aesthetics and/or becoming caught in the case zipper.

1. A carrying case for a portable electronic device

In one of its aspects the present invention is embodied in a carrying case for a portable electronic device.

The case includes (i) an enclosure defining within it interior a volume suitable to contain the portable electronic device, and (ii) an adjustable spring-loaded clip mechanism. The enclosure is substantially standard, and may be made out of fabric including canvas, leather, plastic, metals and like materials suitable to form cases.

The adjustable spring-loaded clip mechanism is original, and includes both (i) a central member affixed to the interior of the enclosure, and (ii) substantially symmetrical left and right members at least one, and preferably both of which, slides under spring forces relative to, and in distension from, both the central member and from the other. The left and right members so acting suitably receive between them, while momentarily forcibly separated, a portable electronic device. In accordance that the at least one, and preferably both, of the left and right members that slide may slide to greater or to lessor separation over a range of separations, the side members will fit between them an electronic devices having a dimension within this range. Then, at least one and preferably both of the left and the right members being permitted to slidingly retract, the left and right members will squeeze and to grasp the portable electronic device between them. The left and right side members will hold fast the portable electronic device to the central member, and thus to the enclosure, and thus also to the carrying case at its interior.

The case may in particular be suitable to contain a personal digital assistant (PDA), the adjustable spring-loaded clip mechanism then serving to squeeze and to grasp the PDA from side-to-side in a equivalent manner to which the personal digital assistant might otherwise be held by a human hand.

The volume defined by the enclosure is preferably sufficiently commodious—about 7" H×4½" W×1½" D—and the range of distension of which the adjustable spring-loaded clip mechanism is capable is preferably sufficiently great—most typically from about 2¾" to about 3½"—so to permit a number of differently sized PDAs—substantially all such devices available circa 2002—to be at different times contained within the carrying case.

2. A personal digital assistant carrying case

In another of its aspects the present invention is embodied in a personal digital assistant (PDA) carrying case having (i) an enclosure defining a volume sufficient to contain each of a plurality of differently-sized substantially-rectilinear parallelipiped-bodied PDAs each having a greater width than thickness, where certain smaller ones of the PDAs are subject to undesirably move within the volume unless motionally constrained, and (ii) a spring clip, affixed to and at an interior of the enclosure at a position behind where each PDA is desirably held.

This spring clip has jaws that dimensionally extend and separate from each other so wide so as to receive between them an entire width of a substantially-rectilinear parallelipiped-bodied PDA. The jaws then contracting under spring force so as to hold squeezed between them, and motionally constrained to and within the enclosure, the PDA.

By this construction, and this coaction, nothing needs be permanently affixed to the PDA, which. is simply held across its width and not across its thickness by the squeezing jaws of the spring clip.

The spring clip is preferably realized as (i) a substantially planar central member affixed to the interior of the enclosure, and (ii) substantially planar substantially symmetrical left and right jaw members at least one, and preferably both of which, slide relative to the central member. These jaw members slide both towards and away from each other and from the central planar member. They are movable to a separation sufficient so as to admit the entire width of the substantially-rectilinear parallelipiped-bodied PDA between them.

Finally, the spring clip includes (iii) at least one spring forcibly urging at least one of the sliding jaw members to proximity with at least one of the central member and a remaining jaw member. The force of the spring thus acts to urge the jaws to draw together, squeezing the entire width of the substantially-rectilinear parallelipiped-bodied PDA between them.

The (iii) at least one spring preferably connects each of the sliding left and right jaw members—each of which preferably slides—directly to the other, completely spanning over an intervening region of the central member. By this connection, and this coaction, the sliding jaw members taken together, and also the PDA held by the sliding jaw members, are adjustable in their collective position relative to the central member (and to the enclosure to which the central member is affixed) over a modest distance both left and right. In other words, the held PDA may be modestly adjusted in left-right position within the enclosure. Although not quite "self-centering", this adjustability permits PDAs of varying sizes to be better "lined up" and located within enclosure to user preferences.

Moreover, the (iii) at least one spring is preferably implemented as two parallel springs for reasons of increased spring force, wider operative range, and "fail-safe" durability.

The spring clip's substantially planar central member is most preferably economically formed as a substantially rectangular piece of sheet metal having at opposed side edges curled lips. These curled lips defining a channel in which each of the spring clip's left and the right sliding jaw members is held, and does slide.

Likewise, each of the spring clip's substantially planar substantially symmetrical left and right jaw members is preferably also constructed from a substantially rectangular piece of sheet metal, now bent substantially at a right angle of "L" cross section. In this form one planar leg of the "L"

slides within the channel of the central member while the remaining planar leg of the "L" extends to engage a side surface of the PDA.

Still furthermore, the that planar leg of the "L" which extends to engage a side surface of the PDA is preferably bend inward at its terminus edge so as to better compressively engage and hold a side surface of the PDA.

These and other aspects and attributes of the present invention will become increasingly clear upon reference to the following drawings and accompanying specification.

BRIEF DESCRIPTION OF THE DRAWINGS

Referring particularly to the drawings for the purpose of illustration only and not to limit the scope of the invention in any way, these illustrations follow.

DESCRIPTION OF THE PREFERRED EMBODIMENT

The following description is of the best mode presently contemplated for the carrying out of the invention. This description is made for the purpose of illustrating the general principles of the invention, and is not to be taken in a limiting sense. The scope of the invention is best determined by reference to the appended claims.

Although specific embodiments of the invention will now be described with reference to the drawings, it should be understood hat such embodiments are by way of example only and are merely illustrative of but a small number of the many possible specific embodiments to which the principles of the invention may be applied. Various changes and modifications obvious to one skilled in the art to which the invention pertains are deemed to be within the spirit, scope and contemplation of the invention as further defined in the appended claims.

Figure 1:
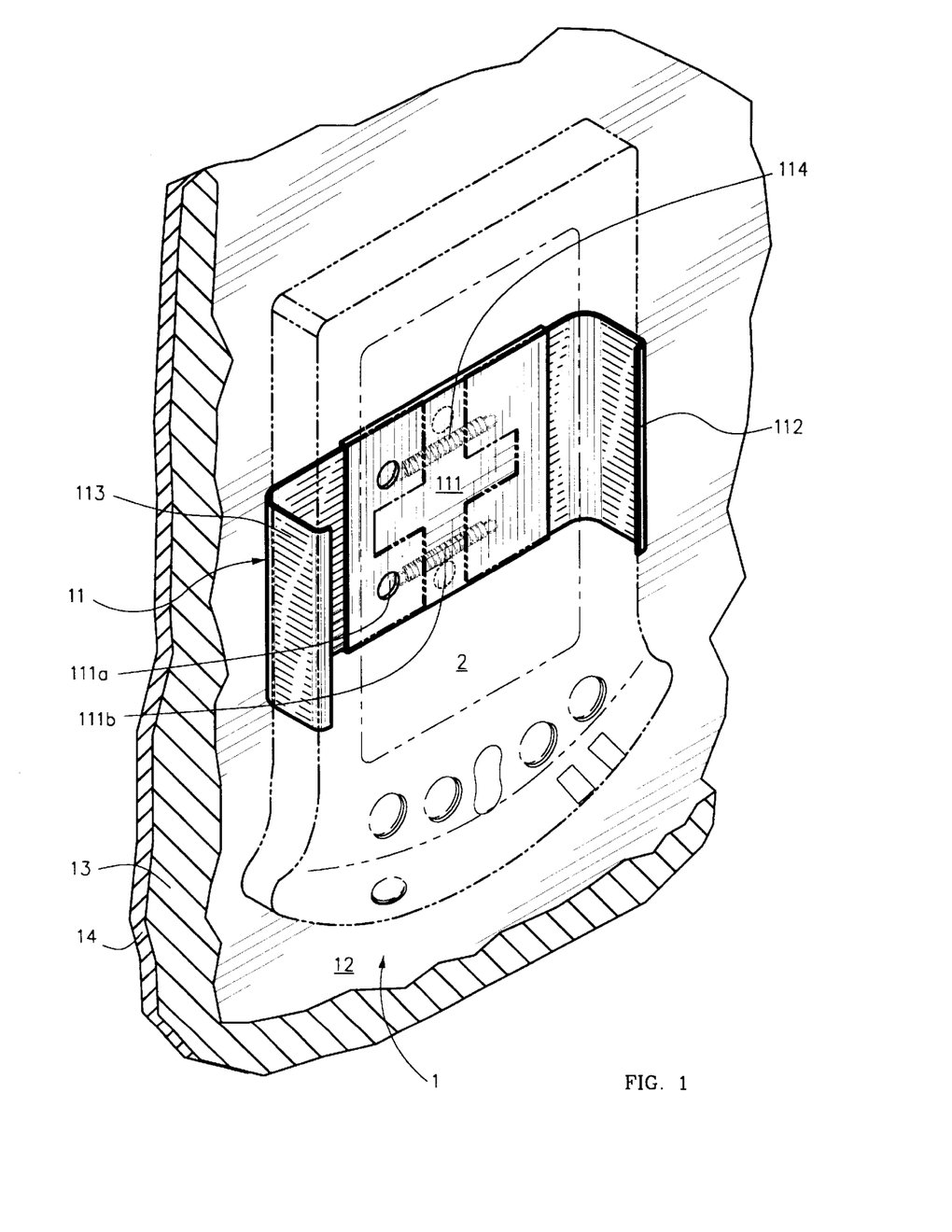
FIG. 1 is a diagrammatic perspective view showing a portion of a preferred embodiment of a carrying case in accordance with the present invention laid open to show a preferred embodiment of a spring clip grasping, and retaining, a personal digital assistant.

A diagrammatic perspective view showing a portion of a preferred embodiment of a carrying case 1 in accordance with the present invention is shown in FIG. 1. The case 1 is laid open to show a preferred embodiment of a contained spring clip 11 grasping, and retaining, by way of example a personal digital assistant 2 (shown in dashed line; not part of the present invention). The carrying case 1 may have, by way of example, (i) a back plane 12, often stiffened with a plastic or other rigid planar insert, (ii) side panels 13, typically of fabric sewn to the back plane 12, terminating in a zipper 14. A complimentary top section to which what would then be a conventional zippered case 1 is not shown in Figure, which shows just a portion of the case 1 in a laid-open position.

Most important in FIG. 1 is the interaction between the spring clip 11 and the electronic device 2 (not part of the present invention), illustrated to be a Personal Digital Assistant (PDA) that it serves to hold. Although further views of the action of the spring clip 11 will be shown, in particular, in FIGS. 9 and 10, FIG. 1 should be appreciated for showing that the spring clip 11 has (i) a central member 111 that is always affixed to the interior of the enclosure, and (ii) two side members 112, 113 least one of which slides under force of (i) spring(s) 114 (shown in phantom line in FIG. 1 for being obscured by central member 111) relative to, and in distension from, both the central member 1 and the other side member 112, 113 (as the case may be). Preferably both side members 112, 113 are free to so slide relative to the central member 111 and to each other (in a manner to be further elucidated hereinafter). In such a case only the central member 111 is directly mounted to the case 1, normally by fasteners such as rivets of the like operating at the holes 111b (outline shown in dashed line).

Importantly, however, the spring clip 11 of the present invention functions to hold the electronic device 2 even when, and if, so few as one (only) of its side members 112, 113 does slide. This will occur, for example, if the mounting is made, by way of example, at the illustrated holes 111a through both the central member 111 and here, by way of example, also the right side member 113, by means of rivets or the like. Even though the sliding action of the spring clip 11 has not as of yet been completely explained, it is possible to understand that so mounting the central member 111 and the right side member 113 at and by fasteners (not specifically shown) in the same holes affixes both these elements not only to the case 1, but to each other. Accordingly, they do not slide relative to one another, but are instead fixed in position to each other. Accordingly, they could be, and could be formed as, but one single element: a combination central member and side member. Thus when a "central member" and a "side member" are spoken of in the present application and its claims, it will be understood that two separate physical members are not invariably required, and that the expressed identity of these elements is, as will be understood by a practitioner of the mechanical arts, merely a guide to their intended function, and not by way of limitation on any of the numbers, relationships, etc. of these elements unless explicitly so stated.

Various detail views of the preferred embodiment of the same spring clip 11, or parts thereon, previously seen in FIG. 1 are shown in each of FIGS. 2–12.

Figure 2:
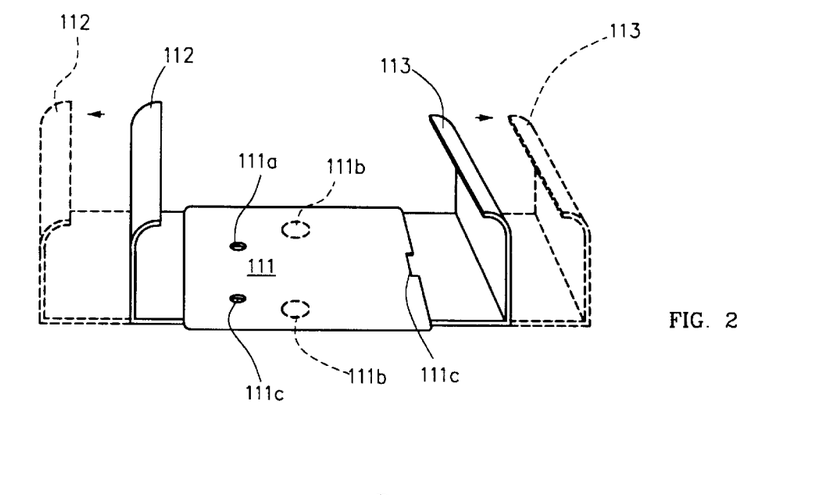
FIG. 2 is a top perspective view of the preferred embodiment of a spring clip in accordance with the present invention previously seen in FIG. 1.

A top perspective view of a variant of the spring clip 11 previously seen in FIG. 1 is shown in FIG. 2. By mounting at holes 111b, capturing thus the central member 111 only, both the left sliding member 112, and the right sliding member 113, move and slide relative to each other, and to the central member 111. If, alternatively, mounting is at holes 111a, both the central member 111 and—by way of opposite example to FIG. 1 where the right side member might be captured—the left side member 112 are captured together, and only the right member—now the sole sliding member—113 move and slide relative to both the central member 111 and the left side member 112.

A catch tab 111c, normally a simple piece of bent metal integral (in this case) with the right, sliding, member 113, is shown. This catch tab 111c engages the hole 113a1 best seen in FIG. 3 within the right, sliding, member 113, to prevent that the right sliding member should be easily overextended from, and withdrawn outside the containment of, the central member 111.

Figure 3:
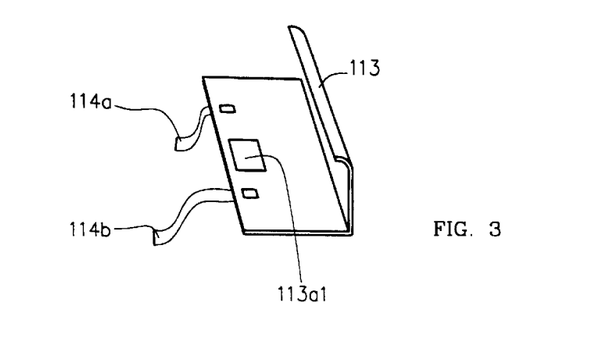
FIG. 3 is a perspective view of (1a) one, right, sliding member with (2) attached springs, of the preferred embodiment of a spring clip in accordance with the present invention previously seen in FIGS. 1 and 2.

A perspective view of an exemplary one, right, sliding member 113 with two attached springs 114a, 114b is shown in FIG. 3. The cooperative interaction of the springs 114a, 114b with the members 111–113 will be further shown in FIGS. 9 and 10. All the sliding members 111–113 are commonly made of bent sheet metal, normally sheet steel.

Figure 4:
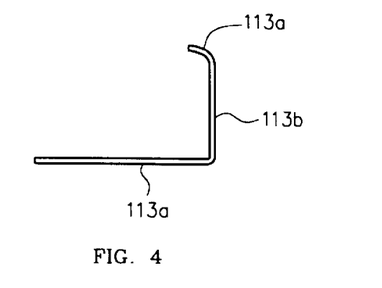
FIG. 4 is an edge side plan view of the right sliding member of the preferred embodiment of a spring clip in accordance with the present invention previously seen in FIGS. 2 and 3.
Figure 5:
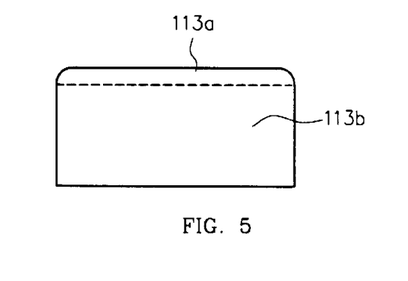
FIG. 5 is an clasping side plan view of the right sliding member of the preferred embodiment of a spring clip in accordance with the present invention previously seen in FIGS. 2 through 4.

Meanwhile, a detail edge side plan view of, by way of example, the right sliding member 113 of the spring clip 11 is shown in FIG. 4. The right sliding member 113 has first planar rectangular portion 113a, a second planar rectangular portion 113b substantially at a right angle to the first planar rectangular portion 113a, and a bent lip 113c. A side plan view of the same right sliding member 113 is shown in FIG. 5.

Figure 6:
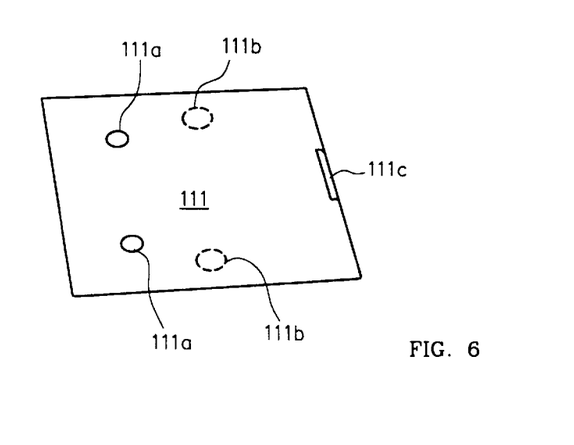
FIG. 6 is a bottom perspective view of (3) a central member of the preferred embodiment of a spring clip in accordance with the present invention previously seen in FIGS. 1 and 2.
Figure 7:
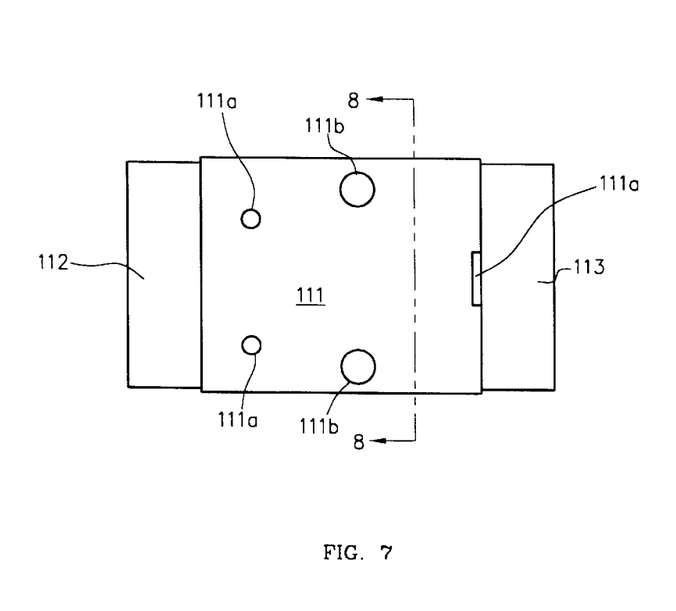
FIG. 7 is a top plan view of both (3) the central member of the preferred embodiment of a spring clip in accordance with the present invention previously seen in FIGS. 1, 2 and 6, and, fitted thereto (1a) the right sliding member plus (1b) the left sliding member both of the spring clip in accordance with the present invention previously seen in FIGS. 1 and 2 through 5.
Figure 8:
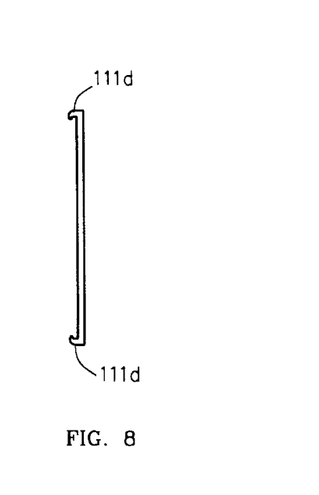
FIG. 8 is an edge side plan view of (3) the central member of the preferred embodiment of a spring clip in accordance with the present invention previously seen in FIGS. 1, 2 and 6

A bottom perspective view of the central member 111 is shown in FIG. 6. The reverse of the central member 11 slidingly engaging both the left sliding member 112 and also the right sliding member 113 is shown in FIG. 7. Finally, a side view, taken along aspect line 8—8 shown in FIG. 7, of the central member 11 is shown in FIG. 8. The rolled edges 111a, 111b of the central member 111 form a channel in which is captured, and in which slides the left sliding member 112 and the right sliding member 113. A catch tab 111c on one side is shown. Should both side members be sliding, a catch tab can be, and preferably is, formed on each side.

Figure 9:
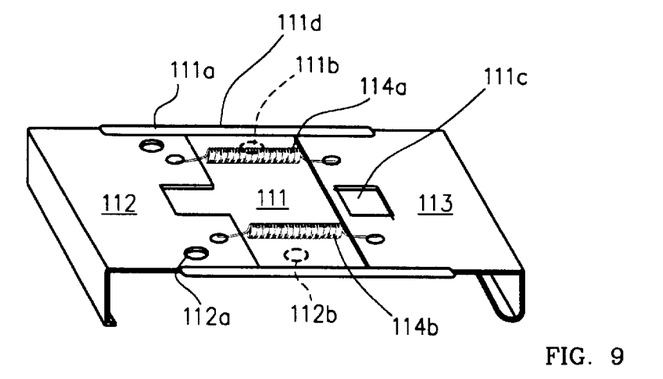
FIG. 9 is a bottom perspective view of the preferred embodiment of a spring clip in accordance with the present invention previously seen in FIGS. 1 and 2.
Figure 10:
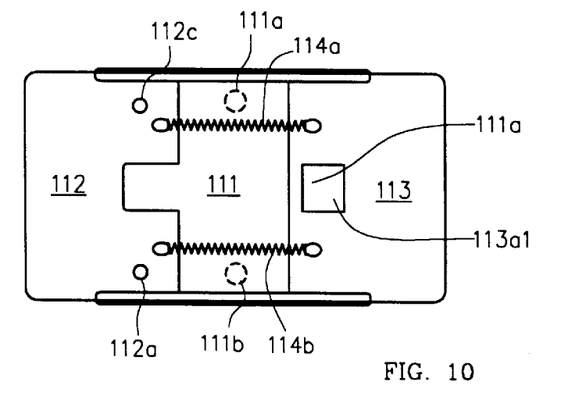
FIG. 10 is a bottom plan view of the preferred embodiment of a spring clip in accordance with the present invention previously seen in FIGS. 1, 2 and 9

A bottom perspective view of the preferred embodiment of the spring clip 11 is shown in FIG. 9. The left sliding member 112 and the right sliding member 113 is slide within the channel formed by the rolled edges 111a, 111b of the central member 111. The springs 114a, 114b, which are affixed, normally by hooking a simple punched hole or tab, at one end to the left sliding member 112 and at the other end to the right sliding member 113 serve to urge these members together under spring force. Another, planar, view of this structure, and this co-action, is shown in FIG. 10.

Figure 11:
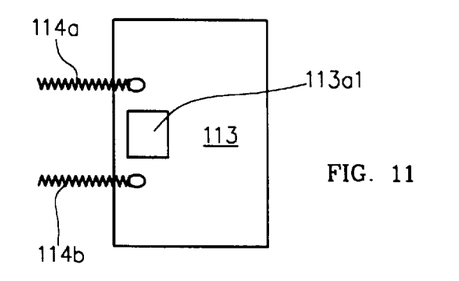
FIG. 11 is a bottom plan view of the (1a) one, right, sliding member with (2) attached springs, of the preferred embodiment of a spring clip in accordance with the present invention previously seen in FIGS. 1 through 10.
Figure 12:
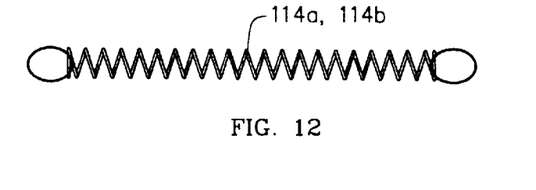
FIG. 12 is a detail side plan view, at enlarged scale, of one of the (2) attached springs, of the preferred embodiment of a spring clip in accordance with the present invention previously seen in FIGS. 3 and 9 through 10.

A bottom plan view of the right sliding member 113 with the two springs 114a, 114b attached is shown in FIG. 11. A detail side plan view, at enlarged scale, of either one of the springs 114a, 114b is shown in FIG. 12. The springs 114a, 114b, are normally and preferably wound spring steel of, most typically, several turns of spring wire.

By operation of the spring clip 11 each PDA, although slightly differently sized and shaped, is secured within the carrying case 1.

The adjustable spring-loaded clip 11 clearly squeezes and grasps a personal digital assistant from side-to-side in a manner equivalent to the manner in which the PDA might otherwise be held by a human hand.

The volume of the carrying case 1 is sufficiently commodious to accommodate at least three different PDAs.

The variable distension of the adjustable spring-loaded clip 11 is sufficient to permit a plurality of differently sized personal digital assistants as are available circa 2002 to be at different times contained within the carrying case 1.

Note that, unlike some mechanisms of the prior art, nothing needs be permanently affixed to the held PDA, which is held across its width and not across its thickness by the squeezing force produced from the sliding members 112, 113 of the spring clip 11.

Note also that, as the sliding members 112, 113 of the spring clip 11 draw together, the squeeze the entire width of the substantially-rectilinear parallelipiped-bodied PDA between them. lot, The- spring clip's substantially planar central member 111, preferably made of stamped sheet metal, thus generally provides opposed side edges curled lips defining a channel in which channel each of the left and the right sliding jaw members 112, 113 is held, and does slide. Also, the left and the right side members, both of which are commonly also made of stamped and bent sheet metal are bent substantially at a right angle of "L" cross section, one planar leg of the "L" sliding within the channel of the central member 111 while the remaining planar leg of the "L" extends to engage a side surface of the PDA 2 (shown in FIG. 1). Since these sliding members 12, 113 are modestly adjustable left and right in collective position relative to the central member 111, and to the enclosure of the case 1 to which the central member is affixed and of which the central member 111 is a part, the held PDA may be modestly adjusted in left-right position within the enclosure. This benefits precision positioning of the PDA within the case as may best suit the owner/user—for example so that a pointer, probe or pencils may be held/stored to one side, or the other of the case 1 (shown in FIG. 1).

Throughout the explanation, the springs 114a, 114b have been shown, and explained, as being two in number. It is, of course, possible to have a greater, or a lessor, number.

In accordance with the preceding explanation, variations and adaptations of the carrying case with internal sliding-member spring clip to grasp and hold diverse portable electronic devices (particularly including personal digital assistants) in accordance with the present invention will suggest themselves to a practitioner of the mechanical design arts. For example, the spring clip could have grasped the held PDA from top to bottom, instead of from side to side.

In accordance with these and other possible variations and adaptations of the present invention, the scope of the invention should be determined in accordance with the following claims, only, and not solely in accordance with that embodiment within which the invention has been taught.

What is claimed is:

1. A carrying case for a portable electronic device comprising:

a enclosure defining within its interior a volume suitable to contain the portable electronic device; and an adjustable spring-loaded clip mechanism having
a central member always affixed to the interior of the enclosure, and
substantially symmetrical left and right side members at least one of which side members slides under spring forces relative to, and in distension from, both the central member and the other side member so as to, while momentarily forcibly spread apart, receive the portable electronic device and then, the at least one sliding side member being permitted to slidingly retract and to squeeze the portable electronic device between itself and the other side member, holding fast the portable electronic device within the carrying case; and
a spring producing the spring forces that urge at least one of the side members to sliding retract from a distended position towards both the central member and the other side member.

2. A carrying case according to claim 1 suitable to contain a personal digital assistant as the contained portable electronic device, the adjustable spring-loaded clip mechanism squeezing and grasping the personal digital assistant from side-to-side in a manner equivalent to the manner in which the personal digital assistant may otherwise be held by a human hand.

3. The personal digital assistant carrying case according to claim 2
wherein the volume defined by the enclosure is sufficiently commodious, and
the distension of which the adjustable spring-loaded clip mechanism is capable,
are sufficient to permit a plurality of differently sized personal digital assistants to be at different times contained within the carrying case.

4. The personal digital assistant carrying case according to claim 1
wherein only the central member of the adjustable spring-loaded clip mechanism is affixed to the interior of the enclosure; and
wherein both the substantially symmetrical left and right side members slide under spring forces relative to, and in distension from, both the central member and each other, the spring forces serving to bias the left and the right side members into greater proximity.

5. The personal digital assistant carrying case according to claim 1
wherein both the central member and one of the side members of the adjustable spring-loaded clip mechanism are affixed to the interior of the enclosure, and thus to each other; and
wherein a remaining one of the side members slides under the spring forces relative to, and in distension from, both the central member and the side member to which the central member is affixed, the spring forces serving to bias the remaining side member into greater proximity with the affixed central member and affixed side member.

6. A personal digital assistant carrying case comprising:
an enclosure defining a volume sufficient to contain each of a plurality of differently-sized substantially-rectilinear parallel epiped-bodied personal digital assistants (PDAs) having greater width than thickness, certain smaller ones of the PDAs being subject to undesirably move within the volume unless motionally constrained;
a spring clip, affixed to and at an interior of the enclosure at a position behind where each PDA is desirably held, the spring clip having
a central member, mounted to the enclosure and constraining for sliding motion each of two
sliding jaws dimensionally sliding relative to the central member and to each other so as to extend so wide apart so as to receive between them an entire width of a substantially-rectilinear parallel epiped-bodied PDA, the jaws then contracting under spring force so as to hold squeezed between them, and motionally held to and within the enclosure, the PDA,
at least one spring between the sliding jaws for producing the spring force that urges the sliding jaws to contract together, squeezing and holding the PDA between them;
wherein nothing needs be permanently affixed to the PDA, which is held across its width and not across its thickness by action of the squeezing jaws of the spring clip.

7. The personal digital assistant carrying case according to claim 6 wherein the spring clip's central member comprises:
a substantially planar central member affixed to the interior of the enclosure; and
wherein the spring clip's sliding jaws comprise:
substantially planar substantially symmetrical left and right jaw members at least one of which slides both towards and away from the other and from the central planar member, the at least one sliding jaw member movable to separation sufficient so as to admit the entire width of the substantially-rectilinear parallel epiped-bodied PDA between both the left and right jaw members; and
wherein the spring comprises:
at least one spring forcibly urging the at least one jaw member that slides into proximity with at least one of the central member and the remaining jaw member, a force of the spring acting to urge the jaw members to draw together, squeezing the entire width of the substantially-rectilinear parallel epiped-bodied PDA between them.

8. The personal digital assistant carrying case according to claim 7 wherein the spring clip's substantially planar central member comprises:
a substantially rectangular piece of sheet metal having at opposed side edges curled lips defining a channel in which channel each of the left and the right jaw members is held, and within which each of the left and the right jaw members does slide.

9. The personal digital assistant carrying case according to claim 8 wherein each of the spring clip's substantially planar substantially symmetrical left and right jaw members comprises:
a substantially rectangular piece of sheet metal bent substantially at a right angle of "L" cross section, one planar leg of the "L" sliding within the channel of the central member while the remaining planar leg of the "L" extends to engage a side surface of the PDA.

10. The personal digital assistant carrying case according to claim 9 wherein the planar leg of the "L" extending to engage a side surface of the PDA is bend inward at its terminus edge so as to better compressively engage and hold a side surface of the PDA.

11. The personal digital assistant carrying case according to claim 7
wherein the at least one spring connects each of the left and right jaw members to the other, completely spanning over an intervening region of the central member;
wherein the jaw members together, and also the PDA held by the jaw members, are modestly adjustable left and right in collective position relative to the central member and to the enclosure to which the central member is affixed;

wherein the held PDA may be modestly adjusted in left-right position within the enclosure.

12. The personal digital assistant carrying case according to claim 7 wherein the at least one spring comprises:

two springs.

13. A carrying case for any one of a number of differently-sized and -shaped portable substantially parallelepiped-body electronic devices having a front, a rear, and sides, the case comprising:

a enclosure defining within its interior a volume suitable to contain any one of a number of differently-sized and -shaped portable electronic devices, certain smaller ones of the devices being undersize to the enclosure which is at the same time oversize to these smaller ones of the devices; and an adjustable spring-loaded clip with grasping elements mounted to the enclosure at its interior, the clip's grasping elements spreading under force of human hands and fingers wide against an internal spring force so as to permit entry of a substantially parallelepiped-body electronic device between the grasping elements, and then, when spreading force of the human hands and fingers is relieved, moving to squeeze and to grasp the sides of portable electronic device between them, holding fast the portable electronic device within the enclosure and within the carrying case, the grasping elements including a substantially rectangular piece of sheet metal having at opposed side edges curled lips defining a channel in which channel each of left and the right jaw members is held, and within which each of the left and the right jaw members does slide, and substantially symmetrical left and right jaw members each of which consists essentially of a substantially rectangular piece of sheet metal bent substantially at a right angle of "L" cross section, one planar leg of the "L" sliding within the channel of the central member while the remaining planar leg of the "L" extends to engage a side surface of the PDA, the planar leg of the "L" extending to engage a side surface of the PDA being bent inward at its terminus edge so as to better compressively engage and hold a side surface of the PDA.

\* \* \* \* \*